US007192347B1

(12) United States Patent
Marks et al.

(10) Patent No.: US 7,192,347 B1
(45) Date of Patent: Mar. 20, 2007

(54) GAME MACHINE HAVING A PLURALITY OF WAYS FOR A USER TO OBTAIN PAYOUTS BASED ON THE APPEARANCE OF ANY AND ALL SYMBOLS WITHIN AN ACTIVE SYMBOL MATRIX ("WHAT YOU SEE IS WHAT YOU GET")

(75) Inventors: Howard Marks, Irvington, NY (US); Daniel Marks, Nyack, NY (US); Anthony Singer, Ringwood, NJ (US)

(73) Assignee: Bally Gaming, Inc., Las Vegas, NV (US)

( * ) Notice: Subject to any disclaimer, the term of this patent is extended or adjusted under 35 U.S.C. 154(b) by 681 days.

(21) Appl. No.: 10/287,847

(22) Filed: Nov. 5, 2002

Related U.S. Application Data

(60) Provisional application No. 60/331,016, filed on Nov. 6, 2001.

(51) Int. Cl.
*G06F 17/00* (2006.01)
*G06F 19/00* (2006.01)

(52) U.S. Cl. ............................ 463/20; 463/16; 463/17; 463/18; 463/19; 463/21; 463/22; 463/25

(58) Field of Classification Search ............. 463/16–22
See application file for complete search history.

(56) References Cited

U.S. PATENT DOCUMENTS

| | | | | |
|---|---|---|---|---|
| 5,380,007 | A | 1/1995 | Travis et al. | |
| 5,401,024 | A | 3/1995 | Simunek | |
| 5,456,466 | A * | 10/1995 | Miles | 463/21 |
| 5,569,082 | A | 10/1996 | Kaye | |
| 5,647,798 | A | 7/1997 | Falciglia | |
| 5,709,603 | A | 1/1998 | Kaye | |
| 5,935,001 | A | 8/1999 | Baba | |
| 5,935,002 | A | 8/1999 | Falciglia | |
| 5,996,997 | A | 12/1999 | Kamille | |
| 6,015,346 | A | 1/2000 | Bennett | |
| 6,068,553 | A | 5/2000 | Parker | |
| 6,102,798 | A * | 8/2000 | Bennett | 463/16 |
| 6,113,492 | A | 9/2000 | Walker et al. | |
| 6,142,873 | A | 11/2000 | Weiss et al. | |
| 6,159,097 | A | 12/2000 | Gura | |
| 6,213,876 | B1 | 4/2001 | Moore, Jr. | |
| 6,261,177 | B1 * | 7/2001 | Bennett | 463/16 |
| 6,331,143 | B1 | 12/2001 | Yoseloff | |
| 6,336,860 | B1 | 1/2002 | Webb | |
| 6,398,644 | B1 * | 6/2002 | Perrie et al. | 463/18 |
| 6,572,471 | B1 * | 6/2003 | Bennett | 463/16 |
| 6,602,137 | B2 * | 8/2003 | Kaminkow et al. | 463/16 |
| 6,645,071 | B2 * | 11/2003 | Perrie et al. | 463/16 |
| 2002/0052233 | A1 * | 5/2002 | Gauselmann | 463/20 |

* cited by examiner

*Primary Examiner*—Scott Jones
*Assistant Examiner*—Milap Shah
(74) *Attorney, Agent, or Firm*—Steptoe & Johnson LLP

(57) ABSTRACT

A gaming device and method for playing a gaming device which provide awards for any and all symbols appearing within selected portions of a symbol matrix ("What You See Is What You Get" or "WYSIWYG").

51 Claims, 6 Drawing Sheets

GAME MACHINE HAVING A PLURALITY OF WAYS FOR A USER TO OBTAIN PAYOUTS BASED ON THE APPEARANCE OF ANY AND ALL SYMBOLS WITHIN AN ACTIVE SYMBOL MATRIX ("WHAT YOU SEE IS WHAT YOU GET")

CROSS-REFERENCE TO RELATED APPLICATIONS

This application is related to and claims priority to provisional patent application Ser. No. 60/331,016, filed Nov. 6, 2001, and entitled "Slot Machine Game Having a Plurality of Ways for a User to Obtain Payouts Based on the Appearance of Any and All Symbols Within the Symbol Matrix ("What You See Is What You Get")." The above-identified U.S. provisional patent application is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to improvements in gaming machines and, more particularly, to a new gaming machine and method that provides improved awards, such awards being credited for any and all symbols appearing within selected portions of a symbol matrix, essentially "What You See Is What You Get" ("WYSIWYG").

2. Background Description

The present invention relates generally to gaming machines, such as slot machines and video poker machines, are becoming increasingly popular. One reason for their popularity is the variety of games and options within games that may be implemented on a gaming machine. Another reason for the popularity of gaming machines is the wide range of wager values accepted by the various gaming machines. Still another reason for the popularity of these gaming machines is the element of chance and the 'thrill' of winning an award.

Gaming machines typically have a video display or mechanical reels upon which a primary game is played. Normally, the gaming machine's top box has a glass panel that displays pay tables for the primary game or artwork representative of the theme of the primary game. Sometimes the top box has a video display upon which a secondary game may be played. The gaming machine's belly glass usually has artwork representative of the theme of the primary game.

To play a conventional game machine, a player deposits money in the form of coins, gaming tokens or paper currency either into a coin head or bill acceptor (the "coin-in"). The coins and gaming tokens are collected in a reservoir located within the gaming machine (the "hopper"), while the paper currency is collected inside the bill acceptor located within the gaming machine. If the coins, gaming tokens or paper currency are validated as authentic, the player accrues the appropriate number of playing units ("credits") on a credit meter located on the gaming machine. The number of credits accrued depends on the denomination of the wager as set on the gaming machine. For example, a twenty-five cent gaming machine will accrue four credits for each dollar deposited into the gaming machine by way of the coin head or the bill acceptor.

On a slot machine, after accruing credits on the credit meter, the player determines how many credits he wishes to wager on a spin of the slot reels (the "total bet"). The player then spins the reels by pressing the spin button or by pulling a handle. When the reels stop spinning, symbols are displayed on the slot reels (the "symbol matrix"). The player then collects credits for predetermined symbol combinations (the "winning combinations"), if any, according to a predetermined pay out schedule (the "pay table").

Typically, slot symbols are displayed on slot reels (also called "columns") placed adjacent to each other. Each column is configured to contain at least three rows, with a symbol displayed in each row. The resulting symbol matrix usually ranges from three columns by three rows, with nine total symbols, to five columns by three rows, with fifteen total symbols. However, the symbol matrix might be configured with almost any number of total symbols. Within the symbol matrix, positions on the slot reels may be referred to according to column, from left to right, and row, from top to bottom (the "symbol positions"). For example, in a 5 column by 3 row symbol matrix, symbol position 1/2 is located in column 1 (i.e., the left-most column) and row 2 (i.e., the middle row).

Players collect credits for predetermined symbols or combinations of symbols that appear in specific symbol positions (the "pay lines"). Winning combinations typically require that three or more of the same symbols appear adjacent to each other starting from the left-most position of a pay line ("line pays"). For example, a player may collect a line pay if 3 banana symbols appear in symbol positions 1/1, 2/1, 3/1 on a pay line using symbol positions 1/1, 2/1, 3/1, 4/1, and 5/1. Alternatively, players may also collect credits for predetermined winning combinations that appear anywhere on a pay line ("line scatter pays") or anywhere in the symbol matrix ("reel scatter pays"). Credits are awarded to the player for each winning symbol combination based upon a predetermined pay out schedule (the "pay table").

Following any type of award (e.g., line pays, line scatter pays or reel scatter pays), the credits won are added to the player's balance of credits as shown in the credit meter. As long as the player has credits on the credit meter, the player may continue to play the gaming machine. Alternatively, the player may collect the remaining balance of credits by pressing a "Cash Out" button located on the gaming machine. In addition, the player may view the rules of the game by pressing a "Help" button before any spin.

Thus, a conventional slot machine is limited in that it only issues awards for the types of combinations of symbols described above. That is, awards are paid only in accordance with a fixed pay table. As a result of this limitation, players must learn how and why certain combinations of symbols form winning combinations; players must memorize the awards listed on the pay table for each of the winning symbol combinations; players suffer from the disappointment of "near-misses" of winning combinations which line-up just off the pay lines; and players suffer from the boredom of playing "new" games that really use the same, old "pay line-pay table" concept.

Thus, a heretofore unaddressed need exists in the industry to address the limitations associated with conventional slot machines by providing awards for any and all individual symbols appearing within the symbol matrix. The What You See Is What You Get ("WYSIWYG") concept creates a slot game that provides players with a unique, entertaining game concept that is simple to play and that provides easy-to-understand awards.

SUMMARY OF THE INVENTION

Briefly, and in general terms, the present invention includes a variety of methods of play that can be programmed on a gaming machine to provide awards for any and all symbols appearing within a selected portion (the "active symbol matrix") of an initial symbol matrix. This concept, "What You See Is What You Get" ("WYSIWYG") provides various awards for any and all of the symbols appearing within the portions of the symbol matrix that have been selectively "activated" for play. WYSIWYG does not depend upon the conventional pay out methods that only issue awards for those symbols appearing on defined pay lines. Moreover, briefly and in general terms, the present invention includes a gaming apparatus wherein a plurality of symbols are displayed on an initial symbol matrix and various awards are issued for any and all of the symbols appearing within selected portions (i.e. the active symbol matrix or win matrix) of the initial symbol matrix. Most commonly, the present invention will be embodied in an electronic video slot machine; however mechanical slots and other types of gaming devices are envisioned.

More particularly, by way of example only and not necessarily by way of limitation, a preferred embodiment of the present invention provides awards for any and all symbols appearing within a symbol matrix. That is, it is possible to "play" all of the symbol positions appearing within the initial symbol matrix, or alternatively, only selected symbol positions appearing with the active symbol matrix may be played. In this regard, the "played" symbol positions of initial symbol matrix comprise the "active symbol matrix" or "win matrix."

The initial symbol matrix is comprised of a display having 5 slot reels with 3 symbol positions located on each reel. This can be in a mechanical or a video slot machine. The symbol set is comprised of U.S. currency, including: nickel, dime, quarter, and fifty-cent coins, plus $1, $2, $5, $1.0, $20, $50, $100, $500, $1,000, $5,000, $10,000' and $100,000 bills. Moreover, the currency symbol set may include a $0 or ---, for which no value is awarded. Nevertheless, it will be appreciated by one of ordinary skill in the art that any denomination, currency or combination thereof may be used in accordance with the present invention.

In practice, a gaming machine is provided having five slot reels, wherein the portions of the slot reels that are displayed to a player comprise an initial symbol matrix. The player selects at least one, and up to all five, of the slot reels upon which to wager. The selected slot reel portions of the initial symbol matrix comprise an active symbol matrix. Next, the player selects the amount (i.e., $1) of wager per slot reel. Then, the player presses the Spin button and all of the slot reels spin. Once the slot reels have stopped spinning, the game awards the cumulative face value of any and all symbols appearing on the selected slot reels (i.e., on the active symbol matrix) located within the initial symbol matrix. However, because the displayed symbols may include 'symbols' which have no value, (i.e., a "$0," a "---," or the like), the appearance of a symbol within the active symbol matrix does not necessarily guarantee an award. In this regard, the present invention, therefore, does not rely upon the use of conventional pay lines and/or winning symbol combinations. Instead, the present invention simply issues awards based upon the face value of each symbol displayed on the selected slot reels within the active symbol matrix of the initial symbol matrix. That is, there is no relationship between the symbol positions and the total amount of the pay out—it is merely a matter of whether the symbol position was selected or not and whether a symbol providing an award was provided in the selected symbol position. Again, what you see is what you get.

Alternatively, the present invention allows for many other embodiments, including, but not limited to, an embodiment of the present invention that allows for the use of one or more symbol sets. These symbols can include various denominations of currency, sets of 'themed' symbols, and/or the more traditional symbols associated with gaming machines. When it is desired to show currency symbols, the denominations of currency (i.e., cents, dollars, and the like) may be selected, as well as the actual type of currency shown (i.e., U.S. dollars, English pounds, and the like). Themes of symbols also may be selected, such as a circus theme showing symbols of clowns, unicycles, elephants, lions, and the like. Finally, the more traditional symbols may be used in the symbol set, including, but not limited to sevens, bars, and fruit.

In a further embodiment of the present invention, the symbols may issue any type and amount of award, including, but not limited to, credits, free spins, or bonus features. That is, the symbols may award a fixed, variable and/or random number of credits; the symbols may also award one or more free spins; and/or the symbols may trigger any number or type of bonus features.

Embodiments of the present invention allow for any method for selecting symbol positions. For example, symbols selection methods can include, but are not limited to, one-at-a-time symbol selection; selection of symbols in no predetermined order; selection of symbols in groups; all-at-once symbol selection; and/or random symbol selection. In this regard, the player has flexibility in selecting the symbol position(s) comprising the active symbol matrix on which play is desired. Moreover, the present invention permits the selection of the symbol positions by the player(s), by the machine and/or by a third party. For instance, the player may touch a symbol position in order to individually select that particular symbol position for play.

Additionally, the present invention allows for selection of one or more symbol positions in order to "create" the active symbol matrix, or win matrix, from the initial symbol matrix that is displayed on the gaming machine. For example, if a total of fifteen symbol positions are present in the initial symbol matrix, the number of selections may be limited to three, or some other number, of symbol positions which ultimately comprise the active symbol matrix. Also, the number of selectable symbol positions may vary. That is, the number of selectable symbol positions may increase with each additional wager. For example, for a $1 wager, it may be that only three symbol positions are selectable, whereas for a $5 wager, nine symbol positions are selectable. Furthermore, the number of selectable symbol positions may be determined randomly by the machine or by a third party.

The present invention allows for any amount of wager to be made on each of the symbol positions and/or grouping of symbol positions in the active symbol matrix. In this regard, a player may wager $2 on a first row of symbols, $5 on a second row of symbols, and $3 on a third row of symbols, betting that the desired symbol positions will appear in those rows. Different wagers also may be made on each individual symbol, as opposed to, a grouping of symbols. Moreover, the present invention allows for wagering flexibility by allowing any base denomination for the game. For example, the base denomination may be 25 cents, with each wager adding one additional 25-cent increment to the total amount bet. Similarly, the base denomination may be $5.00, with each wager adding an additional $5.00 increment to the total amount bet. It is envisioned that the player, the machine or a third party could determine the base denomination and/or wager increments.

The present WYSIWYG concept also is flexible in that it may be used with any type of game, including, but not limited to, slot machines, poker machines, keno machines, or any other casino gaming devices. It will be appreciated by those of ordinary skill in the art that the present invention may be practiced, by way of example only, and not necessarily by way of limitation, on mechanical slot machines, video gaming machines and electro-mechanical gaming machines. In this regard, regardless of the game or gaming method by which an initial symbol matrix is achieved, implementation of the WYSIWYG concept results in an award for any and all symbols displayed within the selected active symbol matrix areas, or win matrix, of the initial symbol matrix.

In short, all of these alternative embodiments rely upon the underlying WYSIWYG concept that provides awards for any and all symbols appearing within the active symbol matrix, or win matrix.

In another embodiment, the WYSIWYG concept, i.e., that a player may "win" for any and all symbols that are displayed on the active symbol matrix, may be used to provide "bonus" games and events. In addition to the base WYSIWYG game, the present invention also may utilize bonus features, such as a second-screen bonus game. In a preferred embodiment of the present invention, one or more Secret PIN bonus symbols on the initial symbol matrix or active symbol matrix starts the second screen bonus game (the "Secret PIN Game"). In the Secret PIN Game, the main screen is replaced with a second screen image resembling an Automated Teller Machine ("ATM"). The player is prompted to enter a four-digit number using a keypad displayed on the screen. Alternatively, the game may automatically enter the 4-digit PIN number. The game then calculates an award based on the total number of credits wagered times a random value generated from within a pre-determined range. The game issues the resulting award by animating U.S. bills (of various denominations) dispensing from the ATM image. It is envisioned that the Secret PIN Game, or other such similar games, may be played in other ways that result in a bonus award.

The WYSIWYG concept, in accordance with the present invention, can incorporate any form of bonus game using any number of symbols or combinations of symbols. For instance, the present invention may also utilize other bonus features, such as Wild Symbols that replace any or all of the other symbols in determining winning outcomes. Alternatively, wild symbols may only replace limited subsets of the other symbols displayed in the active symbol matrix. Wild symbols, therefore, provide yet another possibility for a player to achieve an award or a winning combination. It is envisioned that the present invention might incorporate any number, type, or kind of Wild symbol and/or utilize other bonus features.

Other features and advantages of the present invention will become apparent to one skilled in the art upon examination of the following detailed description when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The present invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
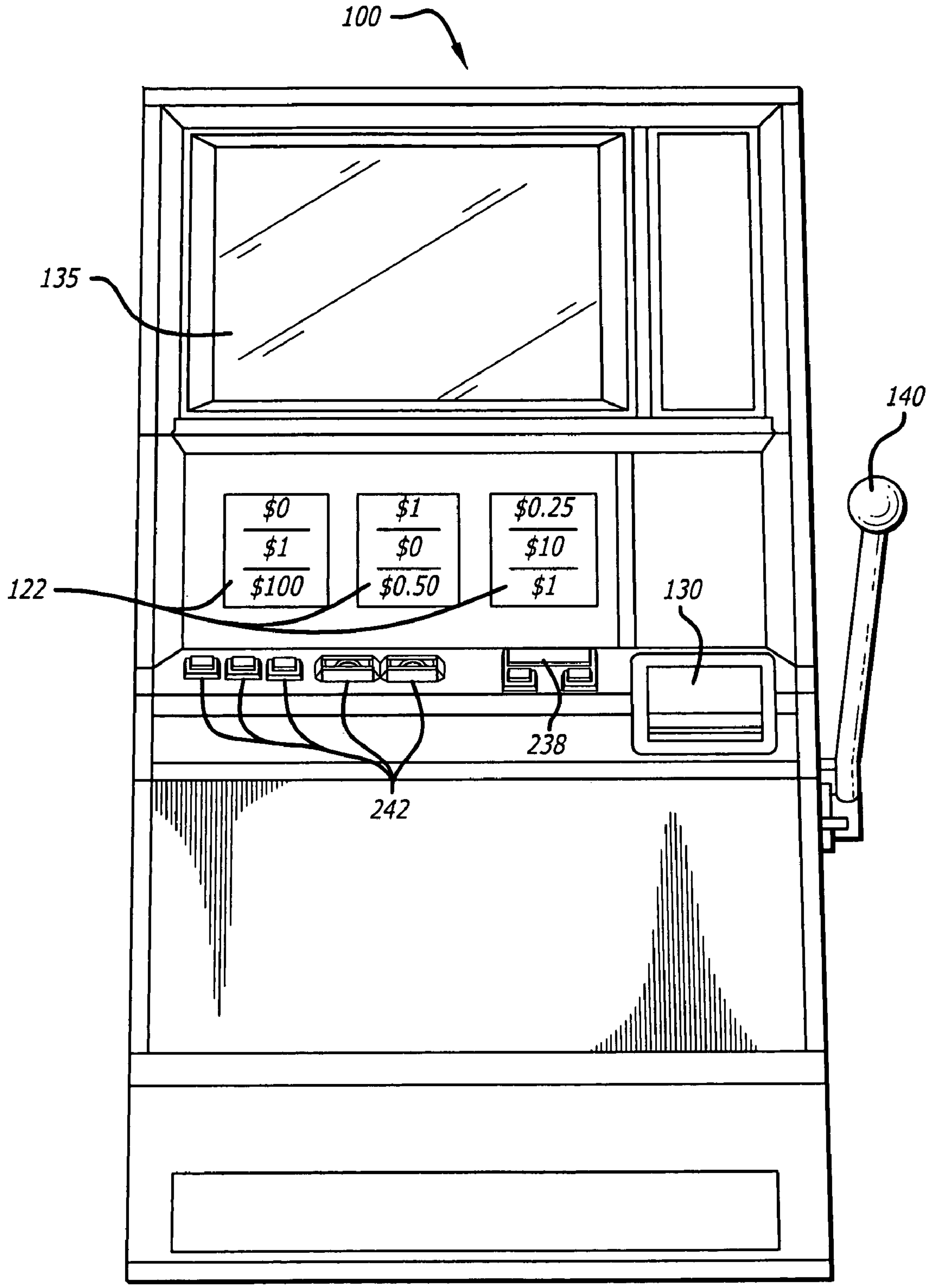
FIG. 1 is a schematic illustrating a typical gaming machine for use, in accordance with the present invention, showing symbols displayed on slot reels wherein the displayed symbols comprise an initial symbol matrix.

Having summarized the invention above, reference is now made in detail to the description of the invention as illustrated in the drawings. While the invention will be described in connection with these drawings, there is no intent to limit it to the embodiment or embodiments disclosed therein. In fact, those of ordinary skill in the art will appreciate upon reading the present specification and viewing the present drawings that various modifications and variations can be made. The intent is to cover all alternatives, modifications and equivalents included within the spirit and scope of the invention, as defined by the appended claims.

Referring now to the drawings, wherein the reference numerals denote like or corresponding parts throughout the drawing figures and, more particularly to FIG. 1, shown is a mechanical slot gaming machine 100. It is envisioned that the gaming machine 100 may embody gaming options other than slot gaming. For example, video poker, keno, and other casino gaming devices may be employed, in accordance with the present invention.

The gaming machine 100, as shown in FIG. 1, is mechanically configured with three or more rotating reels 122 (i.e., the slot reels). The gaming machine 100 also may be configured with a glass panel 135 that may be used to display information for the game or to display artwork representative of the theme of the game. The gaming machine 100 may further be configured with a pull handle 140 for initializing the movement (i.e., spin) of the slot reels 122 or configured with a "Spin" button 238 for initializing movement of the slot reels. In a preferred embodiment of the present invention, a set of control buttons 238, 242 is provided for use by the player to control the functions of the slot game. These buttons may include, but are not limited to, "Bet 1," "Bet Max," "Spin Reels," "Cash Out" and "Help" buttons. In a purely mechanical configuration of the gaming machine 100, these control buttons 238, 242 may be hard-wired to the gaming device. If, however, the gaming device is not purely mechanical, but is instead electro-mechanical, it is anticipated that any or all of these control buttons may be displayed on a video display and/or be hard-wired to the gaming device. Furthermore, any number of buttons may be added to the gaming machine 100 to further facilitate control of the game.

Figure 2:
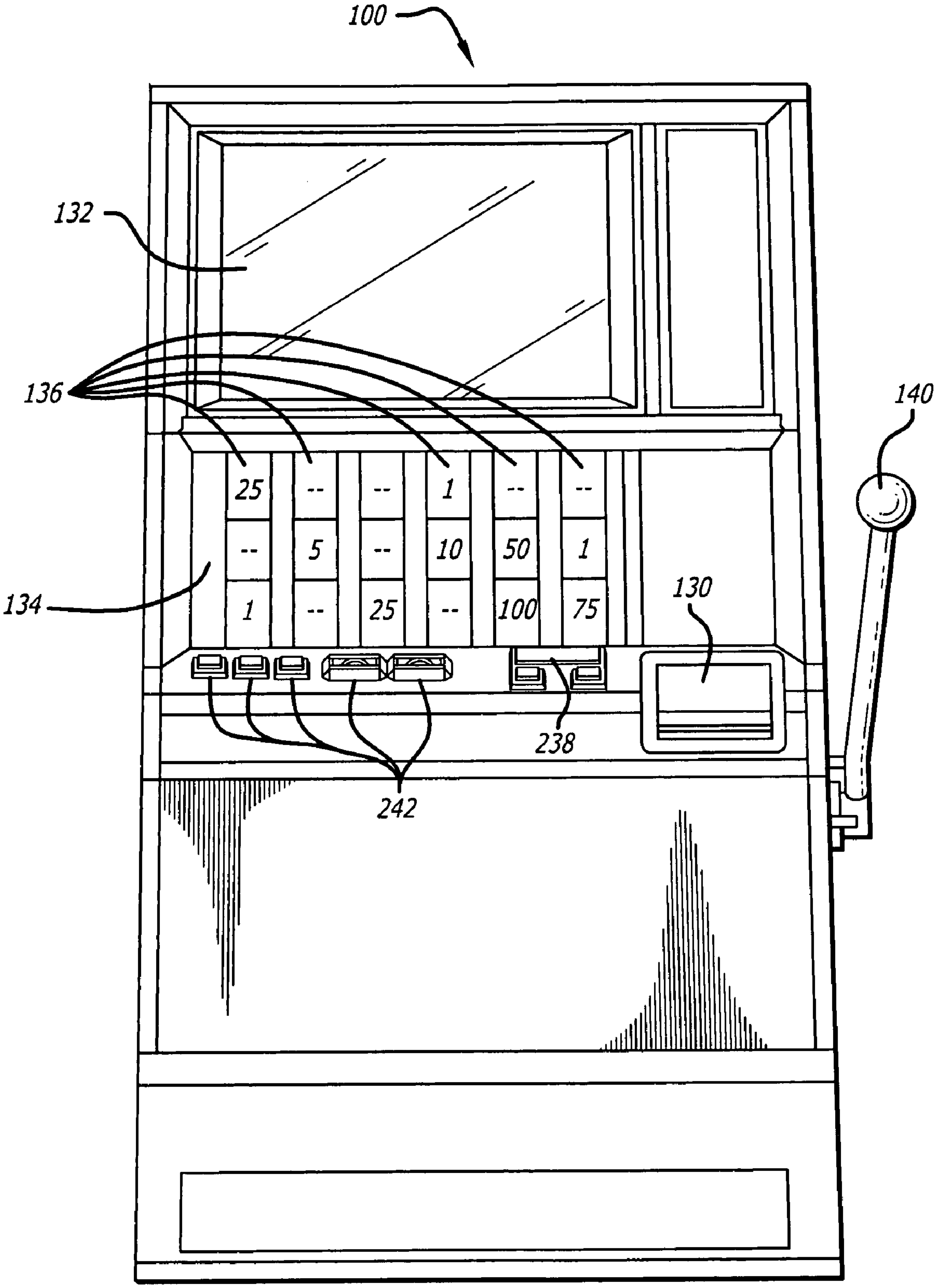
FIG. 2 is a schematic illustrating a typical gaming machine having a video display and further illustrating an optional secondary display.

As shown in FIG. 2, the gaming machine 110 may comprise a secondary display 132. This secondary display 132 may include mechanical and/or video components. In this regard, the secondary display 132 may be used to provide information to the player, to provide game statistics to the player, and/or to provide additional or supplemental gaming opportunities to the player.

As shown in FIG. 2, the gaming machine 110 is configured as a video gaming machine having a video display 134, a secondary display 132, a coin-in 130, and a pull handle 140. In this embodiment of the gaming machine 110, the video display 134 provides a video simulation or representation of a game. FIG. 2 illustrates a preferred embodiment wherein the video display 134 simulates a slot machine having a plurality of slot reels 136. It is preferred that the video will simulate at least three slot reels 136, however, any number of slot reels may be simulated. FIG. 2 illustrates an embodiment in which six slot reels are simulated and three symbol positions are displayed from each reel. That is, a six slot reel simulation displaying three symbols from each slot reel results in an initial symbol matrix having a total of eighteen symbol positions. The slot reels 136 are simulated to "spin" by the video gaming machine 110, such that a reel display, or initial symbol matrix, is shown on the video display 134.

The video gaming machine 110 may further be programmed with software for displaying the playing of the game, in accordance with the present invention. Neither the mechanical game components, or the software and programming for the game forms part of the present invention as claimed herein. As such, no further descriptions of the mechanical components of a game machine or the software or programming of the game machine will be provided. It is maintained that one of ordinary skill in the art will contemplate various methods and means for playing the game with certain mechanical or software configurations, and the invention is not meant to be limited to any such particular method or means.

In the preferred embodiment of the present invention, regardless of whether the gaming machine is a mechanical 100, video 110 or electro-mechanical slot gaming machine, the play of the game utilizing the "What You See Is What You Get" concept is generally the same. The symbols displayed on the mechanical reels 122, or video simulated reels 136, comprise an initial symbol matrix. As shown in FIGS. 3–9, the initial symbol matrix 400 comprises a plurality of symbols 410, wherein each symbol corresponds to a certain symbol position 420 on the displayed reels 122, 136. That is, as illustrated in FIG. 1, if three reels are displayed, and three of the symbols 410 that are located on each reel are displayed, the initial symbol matrix 400 comprises nine symbols and their corresponding symbol positions 420. In this regard, the initial symbol matrix 400 is configured into columns 430 and rows 440 that correspond to the symbol positions 420 displayed on the reels 122, 136.

Typically, to begin play of a slot game, a player inserts currency into the coin-in mechanism 130 and accrues a corresponding number of credits. In the present invention, the player may select any of the columns 430 and/or rows 440 on which he wishes to wager. In other words, the player may select one or more of the columns 430 (see e.g., FIGS. 4 and 9) or one or more of the rows 440 (see e.g., FIG. 5), or the player may select the entire initial symbol matrix 400, i.e., all columns, rows and/or symbol positions (see e.g., FIGS. 3 and 8). Still further, the player may choose to select only particular symbol positions 420 located within the initial symbol matrix 400. In this regard, the player might only select a single symbol position 420 (see e.g., FIG. 6) or the player might select more than one symbol position, where a column and/or row relationship is not present between the symbol positions (see e.g., FIG. 7). In short, the symbol positions, rows and/or columns selected by the player from the initial symbol matrix 400 are used to create an active symbol matrix 480. The symbol positions, rows and/or columns selected by a player are appropriately designated, e.g., highlighted, illuminated or otherwise differentiated from the symbol positions, rows and/or columns of the remainder of the initial symbol matrix 400, to indicate to the player the portions of the initial symbol matrix 400 that comprise the active symbol matrix 480.

The player may then select the amount of credits he wishes to wager on the selected symbol positions 420 within the initial symbol matrix 400. In the present invention, the player may choose to wager different amounts on the selected symbol positions. That is, a player may wager a first amount on a first selected portion of the initial symbol matrix 400 and a second amount on a second selected portion of the initial symbol matrix 400, wherein the selected portions comprise the active symbol matrix 480. The player may also wager on each symbol position individually.

In this regard, the present invention, therefore, does not rely upon the use of conventional pay lines and/or winning symbol combinations. Instead, the present invention simply issues awards based upon the face value of each symbol displayed in the selected symbol positions within the active symbol matrix and the amount wagered on those selected symbol positions. That is, there is no relationship between the symbol positions and the total amount of the pay out—it is merely a matter of whether the symbol positions were selected or not, whether an award amount was provided by the symbol positions selected, and the amount wagered on the selected symbol positions. Again, what you see is what you get.

Figure 3:
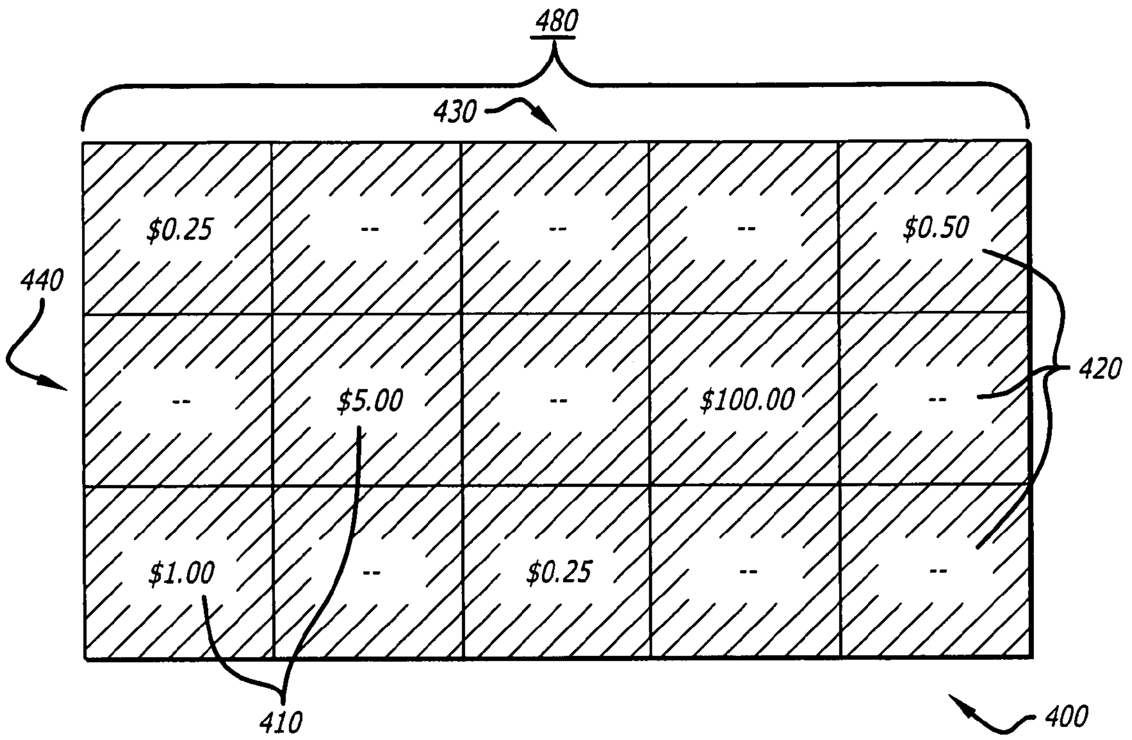
FIG. 3 is an exemplary display of one embodiment, according to the present invention, showing an initial symbol matrix and awards wherein the entirety of the initial symbol matrix comprises the active symbol matrix.

After the player has created the active symbol matrix 480 and made the desired wagers, the player causes the reels 122, 136 to "spin" by pressing the "spin" button 238 or by pulling the pull-handle 140. As shown in FIG. 3, once the reels 122, 136 stop spinning, all of the symbols displayed on the reels to the player comprise the initial symbol matrix 400, while the symbols on the selected rows 440 and columns 430 comprise the active symbol matrix 480. The total award given to the player is dependent upon the cumulative value of any and all symbols appearing within the active symbol matrix 480, multiplied by the wager. In this regard, the award is issued based upon the face value of each and every symbol 410 displayed on the selected portions of the active symbol matrix 480.

A set of meters is provided to display the salient information for the game, including, but not limited to "Total Bet," "Paid" and "Credits." The meters may be configured within the display 134, the secondary display 132 or within other designated areas of the gaming machine 110. Typically, a gaming machine will provide information to the player of the game, such as Credits, Pay Lines Selected, Wager Amounts for Selected Pay Lines, Total Bet, and Paid, using the secondary display 132 or the display 134. The "Total Bet" meter displays the total number of credits wagered on the upcoming spin and may also indicate the number of symbol positions, columns 430 and/or rows 440 selected in the active symbol matrix 480. The "Paid" meter displays the number of credits won on the last spin. The "Credits" meter displays the total number of credits remaining in the player's credit pool, which is increased or decreased according to the player' wins or losses and may be supplemented, if necessary, by the player depositing additional coins, tokens or paper currency. Additional credit may also be downloaded to the machine from a player's account, as is well known by those having ordinary skill in the art.

In the preferred embodiment of the present invention, the player is able to select the value of the wager on each selected column, row and/or symbol position. That is, the player may select the same wager amount on each selection, or alternatively, the player may select wagers of different amounts on each selected column, row or symbol position. The total amount wagered is determined by summing the amounts wagered on each selection.

Following selection of the wager, the player then causes the slot machine to operate by affecting a "spin" of the reels. This spin may be accomplished by any suitable manner, such as the player pressing a "spin" button 238 and watching a video simulation of slot reels 136 or by the player physically pulling the pull-handle 140 or pushing the "spin" button 238 and causing mechanical reels 122 to turn.

In a preferred embodiment of the present invention, the symbol set includes sixteen symbols. For each spin, the machine randomly displays fifteen symbols from the symbol set on the initial symbol matrix. Any suitable symbol or theme of symbols may be used in the symbol set. Common symbols and themes of symbols include U.S. currency, sevens, bars, and fruit. In a preferred embodiment of the present invention, wherein currency symbols sets are utilized, the player is paid the face value of any and all currency symbols appearing in the active symbol matrix 480, multiplied by a wager amount. In an alternative embodiment, wherein symbols other than currency are used, such as sevens or fruit, awards are issued for the symbols appearing in the active symbol matrix 480 according to a pay table with fixed and/or variable amounts, multiplied by a wager amount.

EXAMPLE 1

In a preferred embodiment, a dollar denomination video slot gaming machine is provided having a five reel display comprising a five column 430 by three row 440 initial symbol matrix 400. Five buttons, namely, Bet 1, Bet Max, Spin Reels, Help and Cash Out are provided for controlling play of the game 242, 238. Additionally, three meters, Credits, Total Bet and Paid, are configured on the video screen display 134. A symbol set comprising U.S. currency, including: nickel, dime, quarter, and fifty-cent coins, plus $1, $2, $5, $10, $20, $50, $100, $500, $1000, $5000, $10,000 and $100,000 bills, is provided. Additionally, a "$0" symbol or "---" symbol may be provided which indicates that no value is awarded for the appearance of that symbol in the active symbol matrix.

To begin the game, the player deposits $100 into the bill receptor 130 and the Credits meter counts up from 0.00 to 100.00 since the denomination for this game is one-dollar per credit. The player then selects the portions of the initial symbol matrix on which play is desired to create the active symbol matrix and selects the wagers for the selected positions. That is, the player determines which columns 430, rows 440 or symbol positions 410 he wishes to play. For instance, the player may select only one, or up to all five, of the columns 430 located within the initial symbol matrix 400. The player may, alternatively, select one, or up to all three, of the rows 440 located within the initial symbol matrix 400. Again, the portions of the initial symbol matrix 400 selected by the player comprise the active symbol matrix 480. The player must then select a wager amount for each of the selected columns 430, rows 44 or symbol positions 410. As the denomination for this game is one dollar, the player would then determine whether to wager $1 or more. Assuming that the player selects all five columns at a $1 wager per column, the Total Bet meter would read 5.00 and the Credits meter would read 95.00.

After setting his wager, the player initializes the "spin" of the reels in order to display the initial symbol matrix 400. Using the WYSIWYG concept, the game totals the cumulative value of all of the symbols 410 shown within the active symbol matrix 480. The initial symbol matrix 400 shown in FIG. 3 provides for awards in the 1/1, 1/5, 2/2, 4/5, 3/1 and 3/3 symbol positions 420, and does not provide an award in the 1/2, 1/3, 1/4, 2/1, 2/3, 2/5, 3/2, 3/4 and 3/5 symbol positions 420. In this example, since all of the symbol positions of the initial symbol matrix 400 were selected as the active symbol matrix 480 (the active symbol matrix is denoted as the shaded area of the initial symbol matrix) and the wager was $1 per symbol position selected, the total award is $107 dollars (or 107 credits). The total award reflects the cumulative value of all of the currency symbols 410 displayed with the initial symbol matrix 400, multiplied by the wager amount. The Credits meter counts up from 95.00 to 202.00 and the game Paid meter reads 107.00.

EXAMPLE 2

Figure 4:
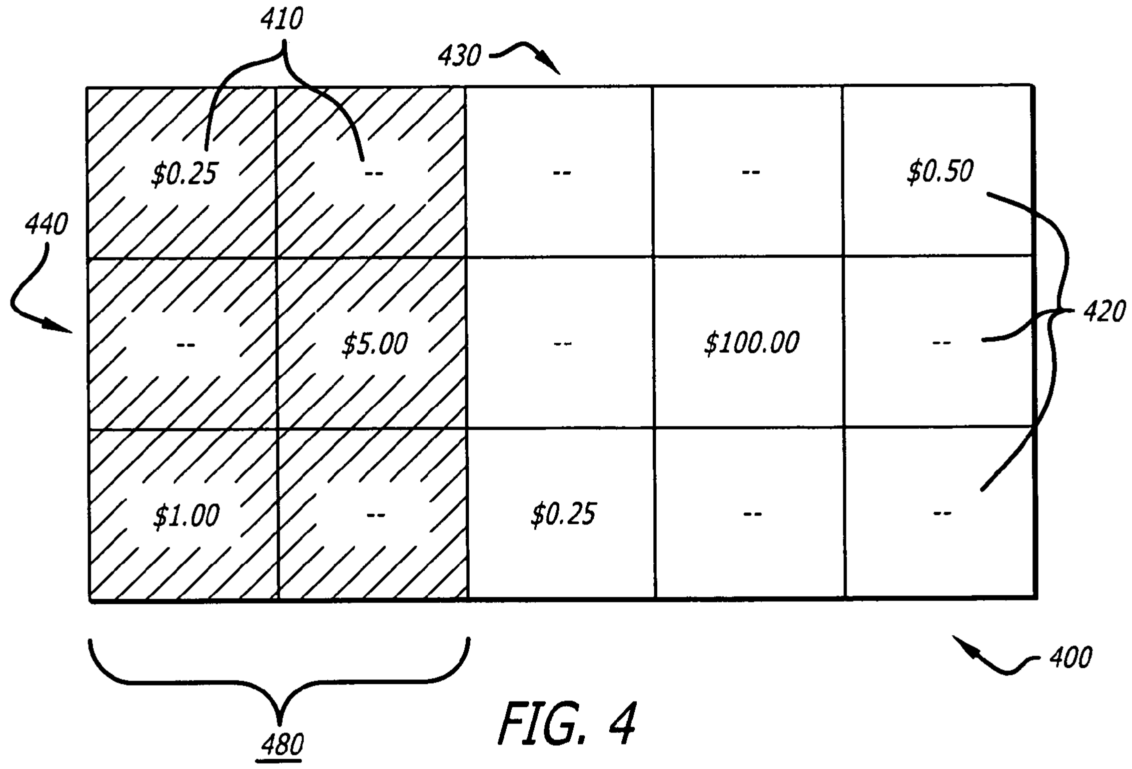
FIG. 4 is an exemplary display of one embodiment, according to the present invention, showing an initial symbol matrix and awards wherein two of the columns of the initial symbol matrix comprise the active symbol matrix.

This example refers to the initial symbol matrix 400 as shown in FIG. 4 and assumes the facts of Example 1 except that the player selects a $2 wager on all of the selected columns. In this regard, the total award would be the cumulative value of the currency symbols displayed in the active symbol matrix ($107), multiplied by the $2 wager. In this regard, the total award for selecting the entire initial symbol matrix 400 as the active symbol matrix 480 and wagering $2 per selected column is $214 or 214 credits.

EXAMPLE 3

This example refers to the initial symbol matrix 400 as shown in FIG. 4 and assumes the facts of Example 1 except that the player selects only the first and second columns 430. That is, the active symbol matrix 480 comprises the first and second columns (i.e., the shaded area), while the initial symbol matrix 400 comprises all five of the columns displayed. In this example, the WYSIWYG concept awards the cumulative value of all of the currency symbols 410 displayed in the active symbol matrix (the first and second columns 430), multiplied by the $1 per column selected wager amount. Thus, the total award would be $6.25 or 6.25 credits.

EXAMPLE 4

Figure 5:
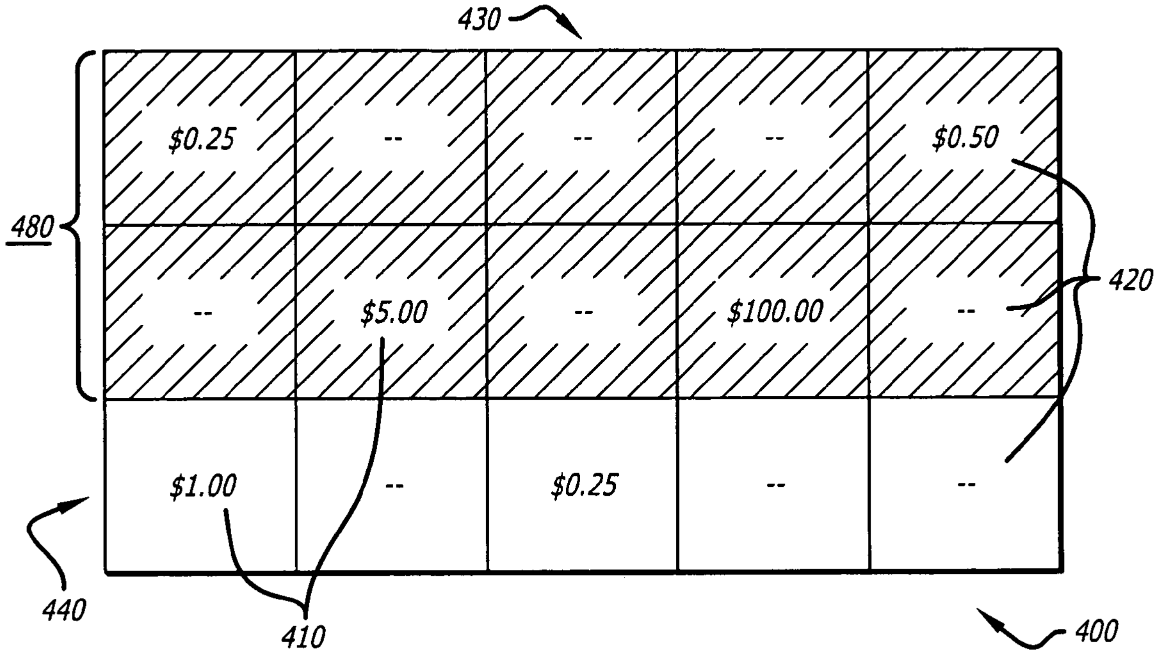
FIG. 5 is an exemplary display of one embodiment, according to the present invention, showing an initial symbol matrix and awards wherein two of the rows of the initial symbol matrix comprise the active symbol matrix.

This example refers to the initial symbol matrix 400 as shown in FIG. 5 and assumes the facts of Example 1 except that the player selects only the first and second rows 440, as illustrated by the shaded areas of FIG. 5. In this regard, the active symbol matrix 480 comprises the first and second rows 440, while the initial symbol matrix 400 comprises all three rows. The total award would be the cumulative value of the symbols appearing in the active symbol matrix 480, multiplied by the wager amount. Values appearing in the initial symbol matrix 400, but not within the active symbol matrix 480 are not awarded to the player. That is, the total award is the cumulative value of the first row, ($0.75), and the second row, ($105.00), multiplied by the wager amount ($1 per pay line). Thus, the total award is $105.75, or 105.75 credits.

EXAMPLE 5

Figure 6:
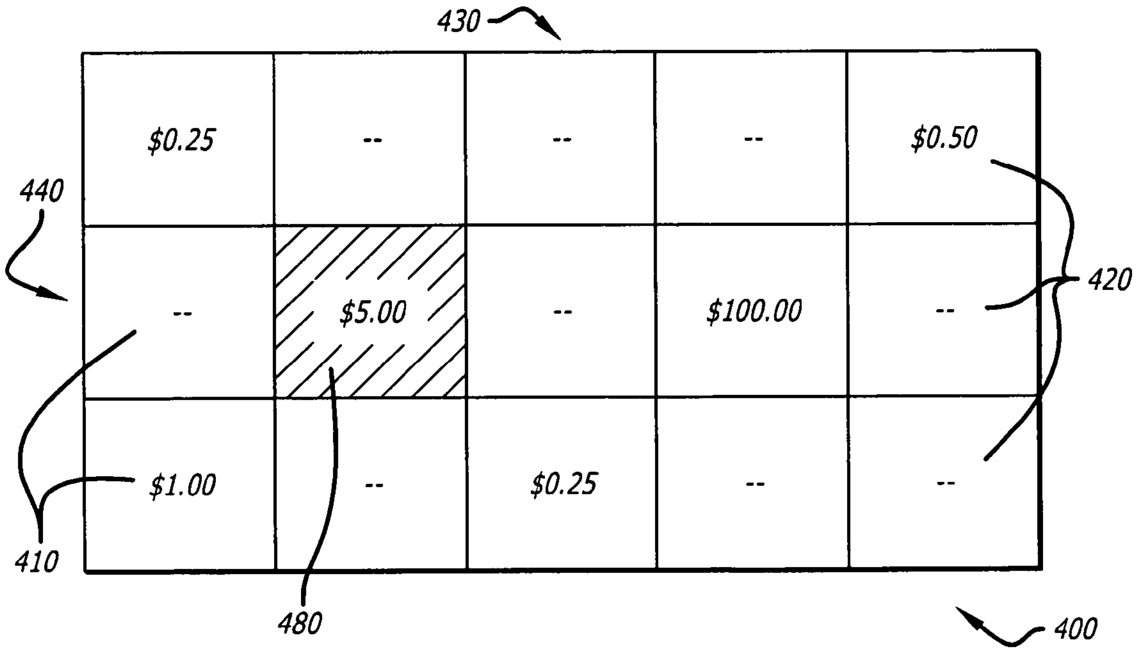
FIG. 6 is an exemplary display of one embodiment, according to the present invention, showing an initial symbol matrix and awards wherein only one selected symbol position of the initial symbol matrix comprises the active symbol matrix.

This example refers to the initial symbol matrix 400 as shown in FIG. 6 and assumes the facts of Example 1 except that the player selects only a single symbol position (i.e., the shaded area of the initial symbol matrix). In this regard, the active symbol matrix comprises only the single selected symbol position. None of the other 14 symbol positions in the initial symbol matrix are played. Thus, the total award will be the value of the symbol appearing in the active symbol matrix 480 (i.e., the single selected symbol position), multiplied by the wager amount. As the value shown in the selected symbol position is $5.00, and the wager amount is $1, the total award is $5.00, or 5.00 credits.

EXAMPLE 6

Figure 7:
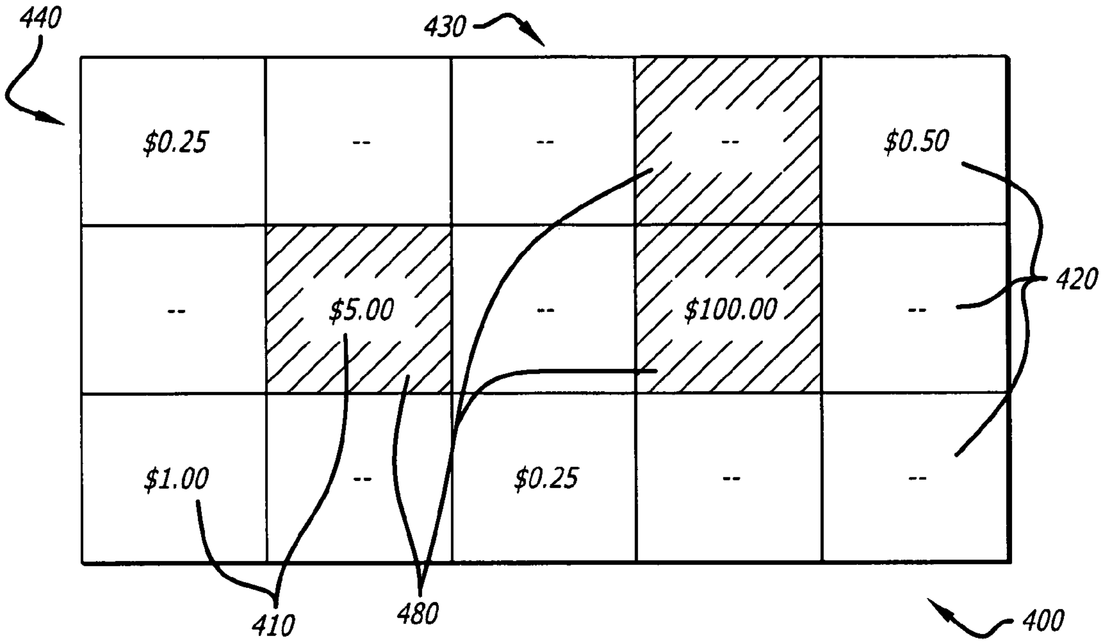
FIG. 7 is an exemplary display of one embodiment, according to the present invention, showing an initial symbol matrix and awards wherein three selected symbol positions of the initial symbol matrix comprise the active symbol matrix.

This example refers to the initial symbol matrix 400 as shown in FIG. 7 and assumes the facts of Example 1 except that the player selects three single symbol positions (i.e., the shaded areas of the initial symbol matrix). In this regard, the active symbol matrix comprises only the three selected symbol positions. The remaining twelve symbol positions in the initial symbol matrix are not played and, thus, the player cannot collect an award for the value of a symbol appearing "outside" of the active symbol matrix.

Moreover, the player places a $1 wager on the symbol position corresponding to the 2/2 position, a $2 wager on the symbol position corresponding to the 1/4 position, and a $5 wager on the symbol position corresponding to the 2/4 position. Thus, the total award would be the value of the symbols appearing in the three selected symbol positions of the active symbol matrix 480, multiplied by their respective wager amounts. The award for the 2/2 symbol position is $5.00, the award for the 1/4 symbol position is $0.00, and the award for the 2/4 symbol position is $500.00. Thus, the total award is $505.00 or 505.00 credits.

EXAMPLE 7

Figure 8:
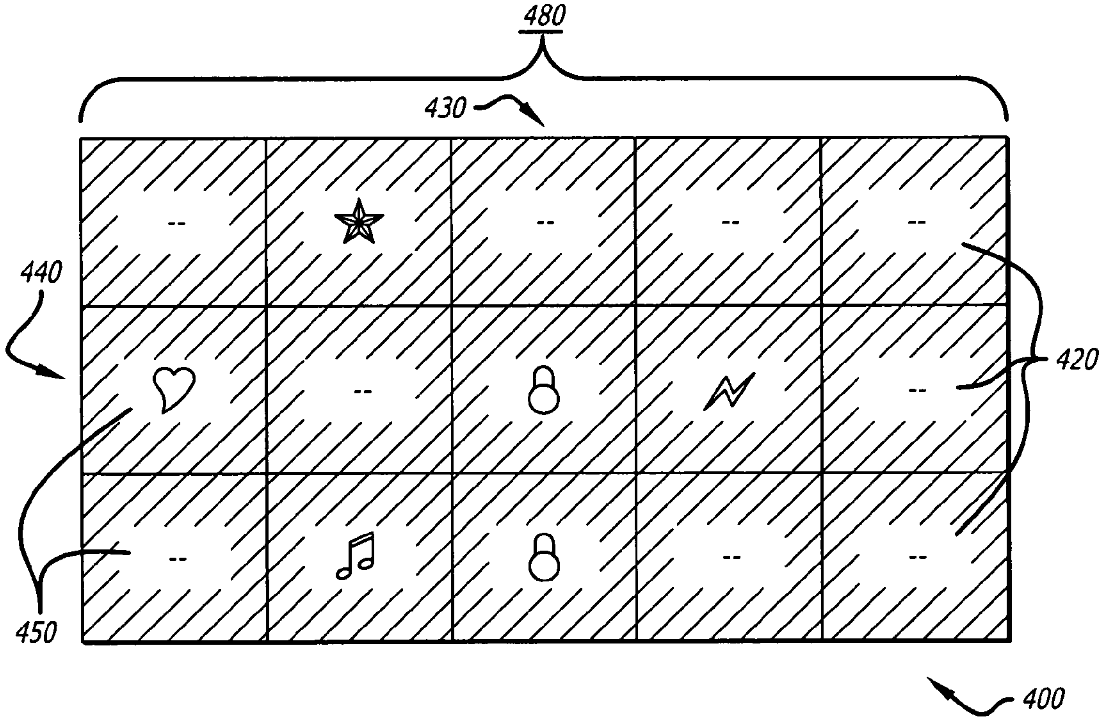
FIG. 8 is an exemplary display of one embodiment, according to the present invention, showing an initial symbol matrix, wherein the award is not readily apparent to the player, and where the entire initial symbol matrix comprises the active symbol matrix.

Referring to the initial symbol matrix as shown in FIG. 8, it is apparent that the symbols 450 displayed within the initial symbol matrix 400 are not represented as currency amounts. As such, in order to award a value for the displayed symbols 450, each symbol 450 must be associated with a predetermined or variable value. Using the symbol displayed in a selected symbol position, the game assigns or matches an award amount to each of the symbols 450 displayed on the active symbol matrix 480. In this regard, the WYSIWYG invention still provides an award for any and all of the displayed symbols 450 shown within the active symbol matrix 480.

Because the player cannot determine the award amount for displayed symbols 450 simply by viewing the initial symbol matrix 400 or the active symbol matrix 480, the award amount is not readily apparent to the player. However, the award amount for the displayed symbols 450 is provided to the player when the gaming machine's controller "matches" the displayed symbols 450 to their respective award values, multiplied by the wager amount for each selected symbol position, and displays the total award.

For instance, referring again to FIG. 8, wherein all of possible symbol positions of the initial symbol matrix have been selected for play, thus also comprising the active symbol matrix, once the values for the symbols are determined, the total award may be computed. If the award amounts are as follows, star=$1, heart=$500, notes=$0.10, locks=$0.05 and lightening bolt=$2.00, when the player wages $1 on all of the selected columns or rows, the total award is $503.20.

EXAMPLE 8

Figure 9:
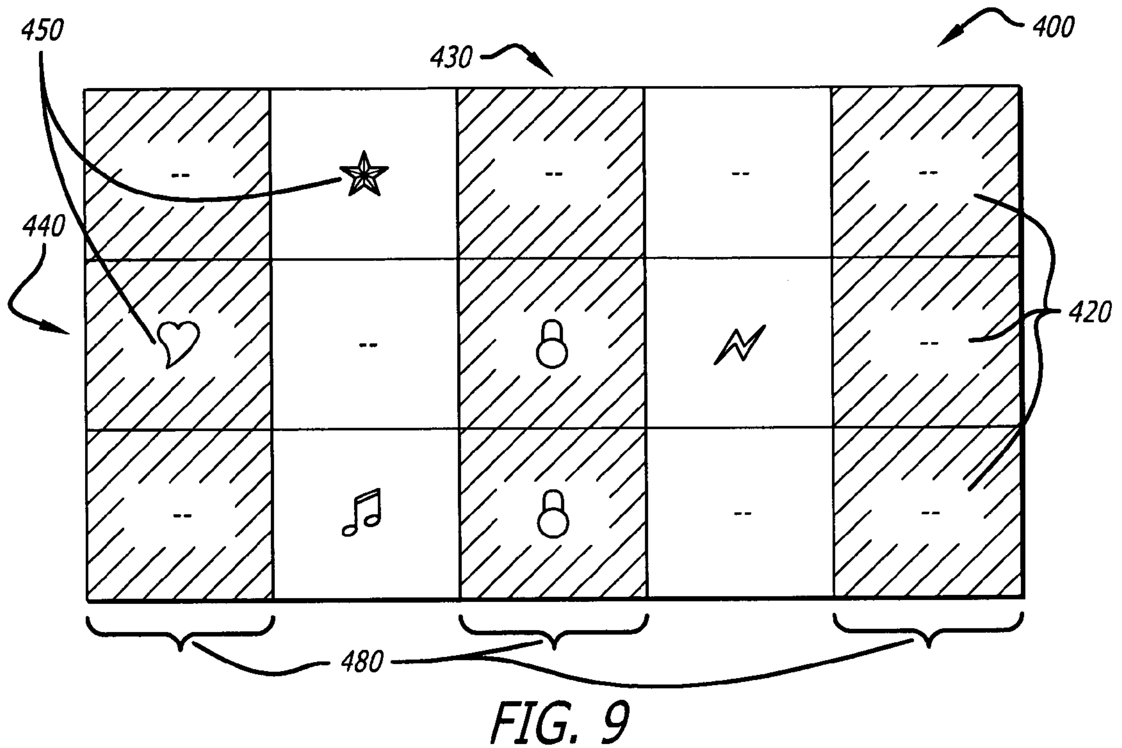
FIG. 9 is an exemplary display of one embodiment, according to the present invention, showing an initial symbol matrix, wherein the award is not readily apparent to the player, and where three selected columns of the initial symbol matrix comprise the active symbol matrix.

This example refers to the initial symbol matrix 400 as shown in FIG. 9 and assumes the facts of Example 7 except that the player selects only three of the columns of the initial symbol matrix (i.e., the shaded areas of the initial symbol matrix). In this regard, the active symbol matrix comprises only the three selected columns, and the two remaining columns of the initial symbol matrix are not in play. Moreover, the player wagers $1 on the first column, $2 on the second column, and $5 on the third column. Thus, the total award would be the value of the symbols appearing in the active symbol matrix 480, multiplied by the wager amount. As the values of the symbols shown in FIG. 9 are not readily apparent, the gaming machine must first "match" the displayed symbols with their corresponding award values. Once the values are known, they are summed and multiplied by the wager amount. In this regard, the total award is $500.10 or 5.00 credits.

If the player is content with his winnings, he may press the Cash Out button, and the gaming device will issue a currency payment, an EZ-PAY™ ticket, an electronic payment or credit a player's account.

Figure 10:
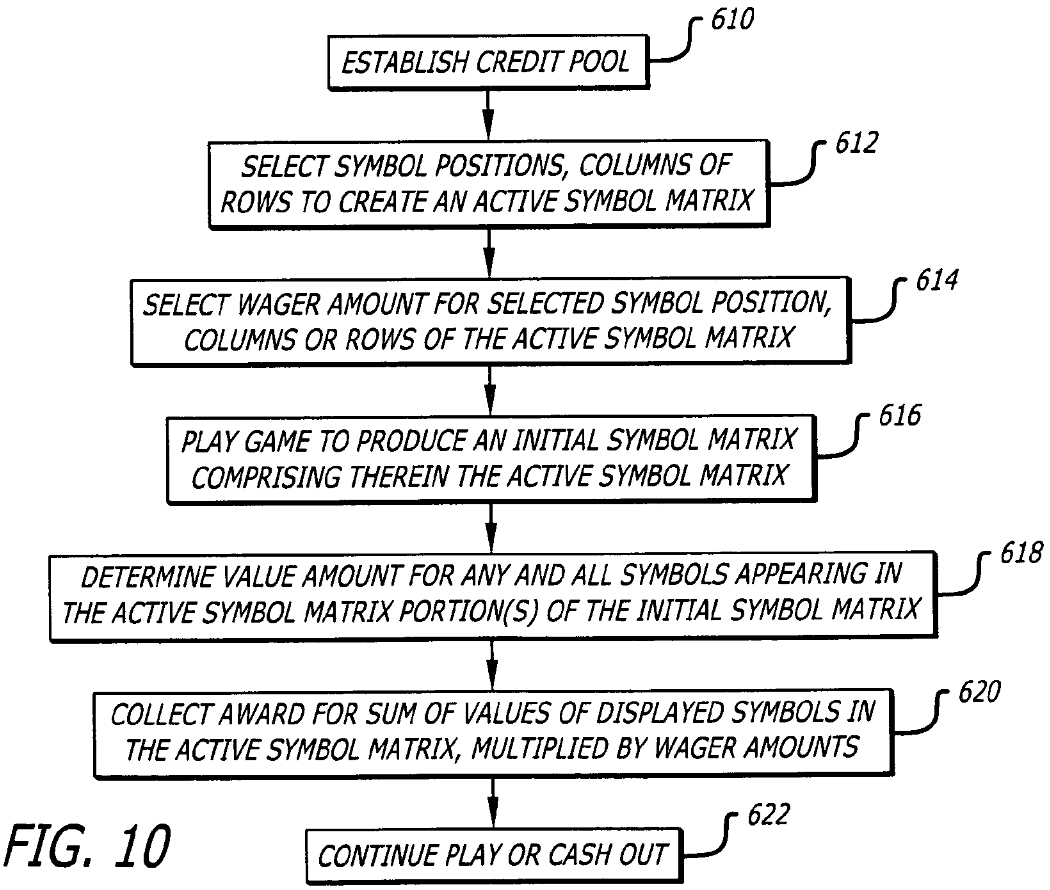
FIG. 10 is a flow chart depicting steps for a method, in accordance with the present invention.

The present invention also may be embodied as a method for playing a game as described in FIG. 10. After establishing a pool of credits 610, the player selects one or more columns or rows 612, or selects specific symbol positions 612, to define the active symbol matrix for play. Next the player selects the amount of wager per column/row or symbol position selected 614. The player then spins the reels such that once the reels have stopped, an initial symbol matrix is displayed 616. In the present WYSISYG invention, an award will be paid for any and all of the displayed symbols on the initial symbol matrix that fall within the active symbol matrix. That is, the face value of the symbols displayed in the active symbol matrix (i.e., the selected columns, rows and/or symbol positions from the initial symbol matrix) is collected by the player 618. Moreover, if symbols are used which lack an apparent face value, the gaming machine will retrieve a corresponding value for the symbols 618, multiply that symbol value by the wager amount for the symbol position, and display a total award. The corresponding value for the symbols lacking an apparent face value may be a constant, predetermined value or may be a variable value. The total award is then added to the credit pool 620. The player must then determine whether to continue play or to cash out 622.

The many features and advantages of the invention are apparent from the detailed specification, and thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

It will be appreciated that a variety of other responsive actions may be taken in accordance with the invention. Those discussed or shown herein have been provided merely for purposes of illustration, and should not be deemed to be limiting upon the broader scope and content of the present invention. The embodiments discussed were chosen and described to provide the best illustration of the principles of the WYSIWYG invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

What is claimed is:

1. A method for playing a game of chance having an initial symbol matrix that includes selectable symbol positions, the method comprising:

selecting at least one symbol position from the initial symbol matrix to designate an active symbol matrix;

selecting a wager amount for the active symbol matrix, wherein the wager amount is individually adjustable for the selected symbol positions in the active matrix;

initiating game play by randomly displaying game symbols in the initial symbol matrix; and receiving an award determined by the game symbols displayed in the active symbol matrix.

2. The method of claim 1, wherein a player selects the wager amount for the selected symbol positions in the active symbol matrix.

3. The method of claim 1, wherein the game of chance is a slot machine game, and wherein the slot machine game includes one or more indicia of slot reels upon which the symbols are displayed, the symbols being displayed in the selectable symbol positions of the initial symbol matrix.

4. The method of claim 1, wherein the symbols displayed in the initial symbol matrix comprise currency denominations, and wherein the award is determined by multiplying the currency denomination of the symbols displayed in each of the selected symbol positions of the active symbol matrix by the wager amount to produce win amounts for each selected symbol position of the active symbol matrix, and then summing the win amounts in the active symbol matrix.

5. The method of claim 1, wherein the symbols displayed in the symbol matrix comprise non-currency denomination symbols, and wherein the award is a determined by multiplying predetermined currency values correlating to each of the non-currency symbols displayed in each of the selected symbol positions of the active symbol matrix by the wager amount to produce win amounts for each selected symbol position of the active symbol matrix, and then summing the win amounts in the active symbol matrix.

6. The method of claim 1, wherein the symbols displayed in the symbol matrix comprise currency denomination symbols and non-currency denomination symbols, and wherein the award is a determined by multiplying predetermined currency values correlating to each of the non-currency symbols displayed in each of the selected symbol positions of the active symbol matrix by the wager amount to produce win amounts, and multiplying the currency denomination of each currency denomination symbol displayed in each of the selected symbol positions of the active symbol matrix by the wager amount to produce win amounts, and then summing all of the win amounts in the active symbol matrix.

7. The method of claim 1, wherein a possible configuration of symbol positions selected by the player to designate the active symbol matrix includes one or more rows of selected symbol positions.

8. The method of claim 1, wherein a possible configuration of symbol positions selected by the player to designate the active symbol matrix includes one or more columns of selected symbol positions.

9. The method of claim 1, wherein a possible configuration of symbol positions selected by the player to designate the active symbol matrix includes non-linear selected symbol positions.

10. The method of claim 1, wherein a possible configuration of symbol positions selected by the player to designate the active symbol matrix includes non-contiguous selected symbol positions.

11. The method of claim 1, wherein a possible configuration of symbol positions selected by the player to designate the active symbol matrix includes all selectable symbol positions.

12. A gaming machine, comprising:

a gaming display panel for viewing game play, wherein the gaming display panel presents a symbol matrix that includes a plurality of symbol display locations;

a means for selecting one or more symbol display locations within the symbol matrix, wherein the selected display locations define an active portion of the symbol matrix;

a means for receiving an individually adjustable player-selected wager amount for each selected symbol display location of the active portion of the symbol matrix;

a means for initiating game play after the active display locations are selected; and a processor for generating a game outcome that comprises the display of one or more game symbols, wherein the game outcome is presented on the gaming display panel once the active portion of the symbol matrix is defined, and wherein the processor awards a prize for each game symbol appearing within the active portion of the symbol matrix.

13. The gaming machine of claim 12, wherein the gaming display panel includes a video representation of slot reels, and wherein the symbol display locations are presented on the slot reels.

14. The gaming machine of claim 13, further comprising a secondary display, wherein the secondary display is a video display that communicates information to a player.

15. The gaming machine of claim 12, wherein the gaming display panel is a video display that communicates game-related information to a player.

16. The gaming machine of claim 15, wherein the video display incorporates interactive player controls.

17. The gaming machine of claim 12, wherein the game symbols displayed on the symbol matrix correspond to currency values, and the prize is a product of the sum of the currency values of the game symbols displayed in the active portion of the symbol matrix and a selected wager amount.

18. The gaming machine of claim 12, wherein the game symbols displayed on the symbol matrix correspond to currency values, and the prize is the sum of the currency values of the game symbols displayed in the active portion of the symbol matrix.

19. The gaming machine of claim 12, wherein the game symbols displayed on symbol matrix includes non-currency symbols that correspond to predetermined currency values, wherein the prize is a product of the sum of the currency values of the non-currency game symbols displayed in the active portion of the symbol matrix and a selected wager amount.

20. The gaming machine of claim 19, wherein the predetermined currency values are constant currency values selected by the processor.

21. The gaming machine of claim 19, wherein the predetermined currency values are variable currency values selected by the processor.

22. The gaming machine of claim 12, wherein the game symbols displayed on the symbol matrix correspond to non-currency values, and the prize is the sum of the currency values of the non-currency game symbols displayed in the active portion of the symbol matrix.

23. The gaming machine of claim 12, wherein the game symbols displayed on the symbol matrix are a combination of currency game symbols and non-currency game symbols.

24. The gaming machine of claim 12, wherein the active portion of the symbol matrix includes one or more rows of the symbol matrix.

25. The gaming machine of claim 12, wherein the active portion of the symbol matrix includes one or more columns of the symbol matrix.

26. The gaming machine of claim 12, wherein the active portion of the symbol matrix includes symbol display positions that are non-contiguous.

27. The gaming machine of claim 12, wherein the active portion of the symbol matrix includes all of the symbol display locations.

28. A gaming machine, comprising:

a game display including a plurality of mechanical reels, wherein each reel includes one or more viewable symbol positions that form a symbol matrix;

a means for selecting one or more symbol positions, wherein the selected symbol positions designate an active symbol matrix;

a means for receiving an individually adjustable player-selected wager amount for each selected symbol position of the active portion of the symbol matrix; and a processor for receiving player input and controlling game play, wherein the processor controls the spinning of the reels to generates a game outcome once the active matrix is designated, wherein the game outcome comprises one or more game symbols displayed on the symbol matrix, and wherein the processor awards a payout for the game symbols displayed within the active symbol matrix.

29. The gaming machine of claim 28, further comprising a secondary display, wherein the secondary display is a video display that communicates information to a player.

30. The gaming machine of claim 28, wherein the game display incorporates interactive player controls.

31. The gaming machine of claim 28, further comprising a means for receiving a player-selected wager amount for the active portion of the symbol matrix.

32. The gaming machine of claim 28, further comprising a means for receiving a player-selected wager amount for each of selected symbol positions that comprise the active symbol matrix.

33. The gaming machine of claim 28, wherein one or more game symbols displayed on the symbol matrix correspond to currency values, and the prize is a product of the sum of the currency values of the game symbols displayed on the active symbol matrix and a selected wager amount.

34. The gaming machine of claim 28, wherein the game symbols displayed on the symbol matrix correspond to currency values, and the prize is the sum of the currency values of the game symbols displayed on the active symbol matrix.

35. The gaming machine of claim 28, wherein the game symbols displayed on symbol matrix includes non-currency game symbols that correspond to predetermined currency values, wherein the prize is a product of the sum of the currency values of the non-currency game symbols displayed on the active symbol matrix and a selected wager amount.

36. The gaming machine of claim 35, wherein the predetermined currency values are constant currency values selected by the processor.

37. The gaming machine of claim 35, wherein the predetermined currency values are variable currency values selected by the processor.

38. The gaming machine of claim 28, wherein the game symbols displayed on the symbol matrix correspond to non-currency values, and the prize is the sum of the currency values of the non-currency game symbols displayed in the active symbol matrix.

39. The gaming machine of claim 28, wherein the game symbols displayed on the symbol matrix are a combination of currency game symbols and non-currency game symbols.

40. The gaming machine of claim 28, wherein the active symbol matrix includes one or more rows of the symbol matrix.

41. The gaming machine of claim 28, wherein the active symbol matrix includes one or more columns of the symbol matrix.

42. The gaming machine of claim 28, wherein the active portion of the symbol matrix includes symbol positions that are non-contiguous.

43. The gaming machine of claim 28, wherein the active portion of the symbol matrix includes all of the symbol positions.

44. The gaming machine of claim 28, wherein the gaming machine is a slot machine, and the plurality of symbol display locations are positioned on one or more slot reels.

45. The gaming machine of claim 28, wherein the plurality of symbol display locations comprises at least three columns.

46. The gaming machine of claim 28, wherein the active display locations of the symbol matrix includes one or more rows of the symbol matrix.

47. The gaming machine of claim 28, wherein the active display locations of the symbol matrix includes one or more columns of the symbol matrix.

48. The gaming machine of claim 28, wherein the active display locations of the symbol matrix includes symbol display locations that are non-contiguous.

49. A method for playing a game of chance having selectable symbol positions, the method comprising:

providing a game having a symbol matrix that includes a plurality of symbol positions;

receiving player input selecting one or more symbol positions from the symbol matrix, wherein the selected symbol positions form an active symbol matrix;

receiving player input selecting an individually adjustable wager amount for each of the selected symbol positions;

randomly displaying game symbols in all the symbol positions of the symbol matrix; and issuing an award for winning game symbols displayed within the active symbol matrix.

50. The method of claim 49, further comprising differentiating the selected symbol positions that form the active symbol matrix from the remaining symbols positions of the symbol matrix.

51. A gaming device, comprising:

a gaming display presenting a symbol matrix that comprises a plurality of symbol display locations;

a means for receiving player input selecting one or more symbol display locations, wherein the selected symbol display locations are designated as an active symbol matrix; and a means for receiving an individually adjustable player-selected wager amount for each selected symbol display location of the active symbol matrix; and a game processor for receiving player input and controlling game play, wherein the processor randomly displays game symbols in the symbol matrix and issues an award when at least one winning game symbol is present in the active symbol matrix.

* * * * *

UNITED STATES PATENT AND TRADEMARK OFFICE

CERTIFICATE OF CORRECTION

PATENT NO. : 7,192,347 B1 
APPLICATION NO. : 10/287847
DATED : March 20, 2007
INVENTOR(S) : Mark et al.

It is certified that error appears in the above-identified patent and that said Letters Patent is hereby corrected as shown below:

In column 3
On line 43, replace “$1.0” with --$10--

In column 9
On line 35, replace “player' ” with --player's--

In column 14
On line 28, replace “is a determined” with --is determined--

Signed and Sealed this

Fifteenth Day of May, 2007

JON W. DUDAS
*Director of the United States Patent and Trademark Office*